United States Patent [19]
Ohuchi et al.

[11] Patent Number: 5,895,840
[45] Date of Patent: Apr. 20, 1999

[54] VIBRATION SENSING DEVICE HAVING SLIDABLE CONDUCTIVE MEMBER

[75] Inventors: Hideaki Ohuchi, Takahama; Yasunari Kato, Toyoake; Kuniaki Ueda, Kariya, all of Japan

[73] Assignee: Denso Corporation, Kariya, Japan

[21] Appl. No.: 08/883,591

[22] Filed: Jun. 26, 1997

[30] Foreign Application Priority Data

Sep. 13, 1996 [JP] Japan ............................... 8-242912
May 19, 1997 [JP] Japan ............................... 9-128544

[51] Int. Cl.⁶ ......................................... G01L 23/00
[52] U.S. Cl. ........................ 73/35.11; 73/651; 310/329
[58] Field of Search ............................ 73/649, 650, 651, 73/652, 35.11, 35.13, 35.09; 310/319, 329

[56] References Cited

U.S. PATENT DOCUMENTS

| | | | |
|---|---|---|---|
| 4,225,802 | 9/1980 | Suzuk et al. | 73/35.11 |
| 4,254,354 | 3/1981 | Keem | 73/35.11 |
| 4,393,688 | 7/1983 | Johnston et al. | 73/35.11 |

FOREIGN PATENT DOCUMENTS

| | | | |
|---|---|---|---|
| 59-164921 | 9/1959 | Japan . | |
| 54-111873 | 9/1979 | Japan | 73/35.11 |
| 62-128331 | 2/1986 | Japan . | |
| 3-2736 | 5/1989 | Japan . | |
| 3-46231 | 9/1989 | Japan . | |

*Primary Examiner*—Hezron Williams
*Assistant Examiner*—Helen C. Kwok
*Attorney, Agent, or Firm*—Nixon & Vanderhye P.C.

[57] ABSTRACT

In a vibration sensing device for sensing a knocking vibration of an engine, a piezoelectric element is connected to an output terminal through a resilient conductive member. The resilient conductive member has a fixed base part, a sliding part at a position opposite to the fixed base part, and an intermediate V-shaped part resiliently contacting the piezoelectric element. When the sliding part moves slidingly in response to vibration of the piezoelectric element, the sliding friction force which exerts on the sliding part increases the spring constant of the resilient conductive member to be larger than the stationary spring constant of the same by hysteresis characteristics, thereby reducing damage to the piezoelectric element and enhancing reliability of the electric connection.

18 Claims, 7 Drawing Sheets

VIBRATION SENSING DEVICE HAVING SLIDABLE CONDUCTIVE MEMBER

BACKGROUND OF THE INVENTION

1. Field of the Invention

The present invention relates to a vibration sensing device or an accelerometer used as a knock sensor which converts knocking vibration of an engine into an electric signal by a vibration-voltage converting element.

2. Related Art

Conventional knock sensors for engines generally have a sensor housing attachable to a cylinder block of an engine, a vibration plate housed in the sensor housing, a piezoelectric element joined to the vibration plate and an output terminal (connector terminal) electrically connected to the piezoelectric element. The piezoelectric element produces a voltage signal corresponding to the knocking vibration occurring in the sensor housing and transmitted to the vibration plate. It is proposed by JP-U 62-128331 that, for simplifying the electric connection between the piezoelectric element and the output terminal, a leaf spring-type resilient conductive member is used. The top end part of the resilient conductive member fixed to the output terminal side is held in resilient contact with the electrode surface of the piezoelectric element so that the voltage signal from the piezoelectric element is transmitted to the output terminal through the resilient conductive member.

It may be effective to set the resiliency (spring constant or elastic constant) of the resilient conductive member large so that the contacting pressure of the resilient conductive member to the piezoelectric element is increased, thereby enhancing the reliability of electric contact between the piezoelectric element and the resilient conductive member. Such a large spring constant, however, is likely to cause damage such as cracks in the piezoelectric element because of the excessive pressing force on the piezoelectric element, when the resilient conductive member is pressed onto the piezoelectric element to flex at the time of assembling the two. Even if not damaged at the assembling process, the piezoelectric element may possibly wear excessively.

Therefore it is desired to set the spring constant of the resilient conductive member low for protecting the piezoelectric element from damages. The lower spring constant will result in lower contacting pressure of the resilient conductive member, causing the resilient conductive member to resonate with the knocking vibration. That is, as the spring constant of the resilient conductive member and the resonance frequency are in proportional relation to each other, the resonance frequency becomes lower with the decrease in the spring constant and often as low as below 10 KHz which is close to the resonance frequency of the vibration plate (piezoelectric element). This resonance of the vibration plate will also cause the resilient conductive member to resonate as well at the time of occurrence of the knocking vibration. The contact part of the resilient conductive member temporarily bounces from the piezoelectric element, resulting in temporary interruption of the electric connection. As a result, not only the knock signal will not be provided accurately, but also the fixed part of the resilient conductive member will break because of fatigue.

SUMMARY OF THE INVENTION

It is therefore an object of the present invention to provide a vibration sensing device more adaptable for use in engine knocking detection.

It is a further object of the present invention to reduce damage of a piezoelectric element of a vibration sensing device and enhance reliability of operation and durability of the same.

According to the present invention, a resilient conductive member is placed resiliently between a piezoelectric element and an output terminal to connect electrically the piezoelectric element and the output terminal. The resilient conductive member has a sliding part slidable on a specified part in the housing so that a sliding friction force caused by sliding of the sliding part increases a spring constant (elastic constant) of the resilient conductive member at a time of the vibration to be larger than that of the same at the stationary state. Thus, the resonance frequency of the resilient conductive member is increased to be larger than that of the piezoelectric element to restrict cracking of the piezoelectric element and temporary interruption of the electric connection caused by the resonance.

Preferably, the resilient conductive member has a V-shaped convex between a base part and the sliding part toward the piezoelectric element to press the piezoelectric element and the sliding part slidably.

Preferably, the output terminal and the resilient conductive member are made integrally from a single metal plate.

Preferably, the piezoelectric element is placed on an annular protrusion provided in a housing and the resilient conductive member is provided at a plurality of positions. Each resilient conductive member has a convex part that contacts the piezoelectric element resiliently at a position above the protrusion. Thus, even when one resilient conductive member fails, another one will maintain the electric connection between the piezoelectric element and the output terminal.

Preferably, each resilient conductive member has a length different from another one. Thus the resonance frequency of the resilient conductive member is differentiated so that at least one of the resilient conductive member will maintain the electric connection between the piezoelectric element and the output terminal.

BRIEF DESCRIPTION OF THE DRAWINGS

These and other objects, features, and characteristics of the present invention will become apparent from the following detailed description when read with reference to the accompanying drawings, in which:

FIGS. 6A(i), 6A(ii) and 6B are schematic views and a time chart showing the embodiment and the vibration mode of the various parts of a piezoelectric element, respectively;

DETAILED DESCRIPTION OF THE PREFERRED EMBODIMENTS

Figure 1:
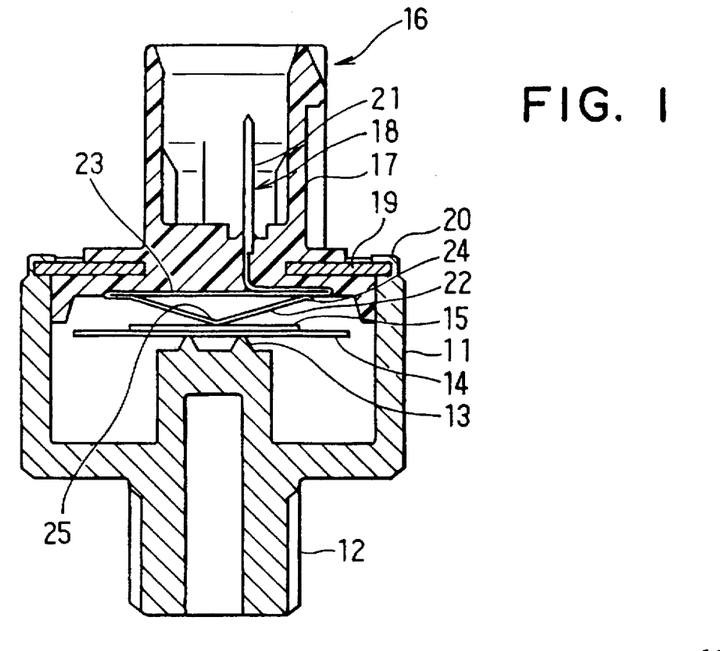
FIG. 1 is a sectional view showing a knock sensor according to an embodiment of the present invention.
Figure 2:
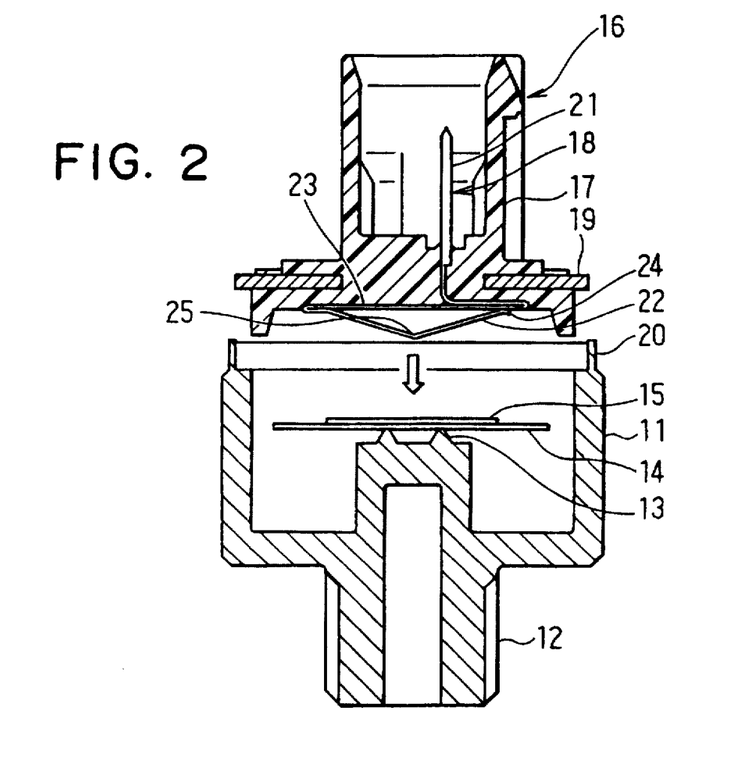
FIG. 2 is a partial sectional view showing a process for assembling a connector subassembly to a sensor housing.

A vibration sensing device according to the present invention is designed as a knock sensor for detecting engine knock. The knock sensor has, as shown in FIGS. 1 and 2, a sensor housing 11 made of metal and formed in a cup shape and a connector subassembly 16. The sensor housing 11 has a threaded part 12 on its bottom radial center for thread-attachment to the cylinder block of an engine (not shown). An annular protrusion 13 is formed to extend upwardly in the upper inside space of the housing 11 and to receive a vibration plate 14 thereon. The vibration plate 14 is projection-welded to the annular protrusion 13 at its bottom central part. A piezoelectric element 15 formed in a circular disk shape is attached to the top central part of the vibration plate 14. The bottom electrode of the piezoelectric element 15 is held in electrically conductive connection with the sensor housing 11 through the vibration plate 14 and the annular protrusion 13 so that it may be grounded to the cylinder block of the engine when the sensor is attached to the engine.

The connector subassembly 16 mounted on the top of the sensor housing 11 is an integral unit of a connector housing 17 made of resin, a signal lead 18 and a cover ring 19 made of metal. The signal lead 18 and the cover ring 19 is insert-molded with the connector housing 17. As shown in FIG. 2, after the insert molding, the connector subassembly 16 is fitted on the sensor housing 11 with the cover ring 19 being engaged with an annular tongue 20 formed circumferentially on the top of the sensor housing 11. The tongue 20 is pressed to cover the cover ring 19 circumferentially and to fix the connector subassembly 16 on the sensor housing 11.

Figure 3:
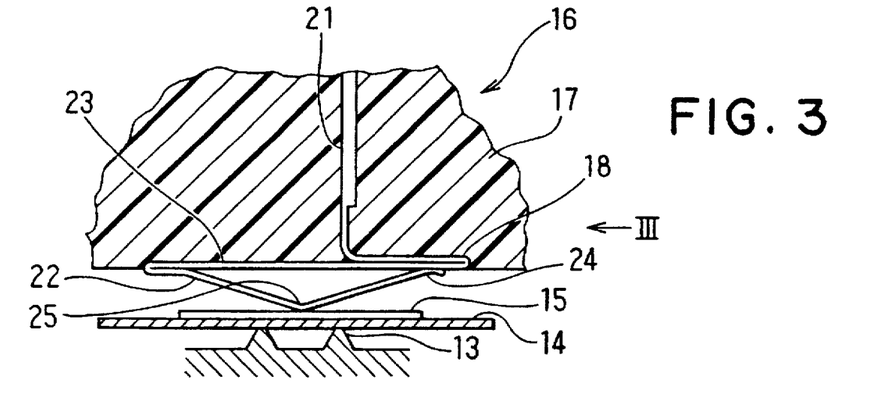
FIG. 3 is a partial sectional view showing a resilient conductive member and associated parts.
Figure 5:
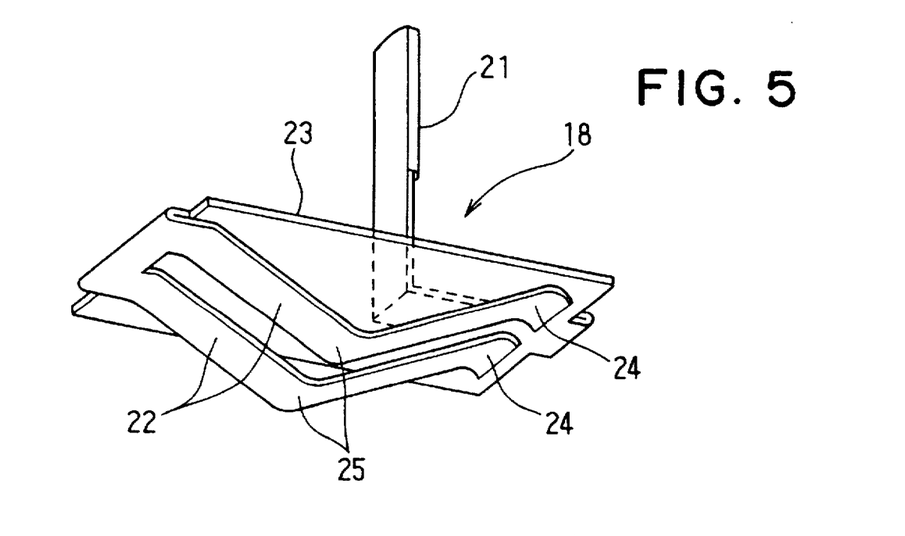
FIG. 5 is a bottom perspective view showing the resilient conductive member.

The signal lead 18 is made by punching and then bending a single metal plate having a resiliency and low electric resistance into a specific shape (FIG. 3), i.e., an output terminal 21 for connection with an external connector (not shown), a resilient conductive member 22 for resilient contact with the top of the electrode of the piezoelectric element 15 and a rectangular plate-shaped fixing part 23 for holding the output terminal 21 and the resilient conductive member 22 integrally. The fixing part 23 is placed underneath the bottom of the connector housing 17 and in parallel with the piezoelectric element 15. The output terminal 21 is formed by bifurcating a narrow strip part of the fixing part 23 from the right to the center over the fixing part 23 and bending the bifurcated strip part at the right angle (FIG. 3 and 5). The resilient conductive member 22 is formed by bifurcating a pair of narrow strip parts from the left to the right in V-shape under the fixing part 23 parallelly. Thus the resilient conductive member 22 has a fixed base end fixed to the left end of the fixing part 23 and a free curved end as a sliding part 24 which is movable slidingly on the bottom surface of the fixing part 23.

Figure 4:
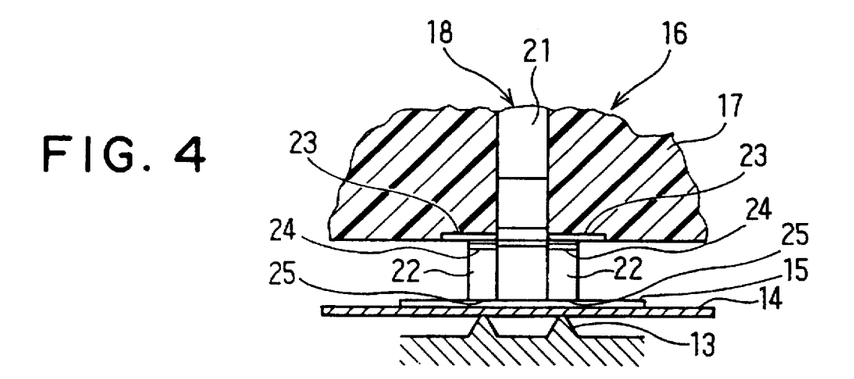
FIG. 4 is a sectional view showing the resilient conductive member viewed in the III-direction in FIG. 3.

The resilient conductive member 22 has a contact part 25 at the bottom of the V-shape so that, as shown in FIG. 4, the contact part 25 is placed on and pressed resiliently to the top electrode of the piezoelectric element 15 at a position just above the annular protrusion 13. Thus, the signal lead 18 transmits the voltage as a knocking signal, which the piezoelectric element 15 produces in response to the knocking vibration, from the top electrode of the piezoelectric element 15 to the output terminal 21 through the resilient conductive member 22 and the fixing part 23.

Figure 6A:
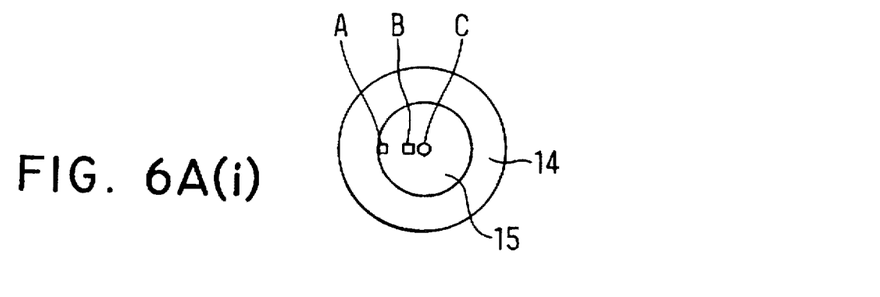
Figure 6B:
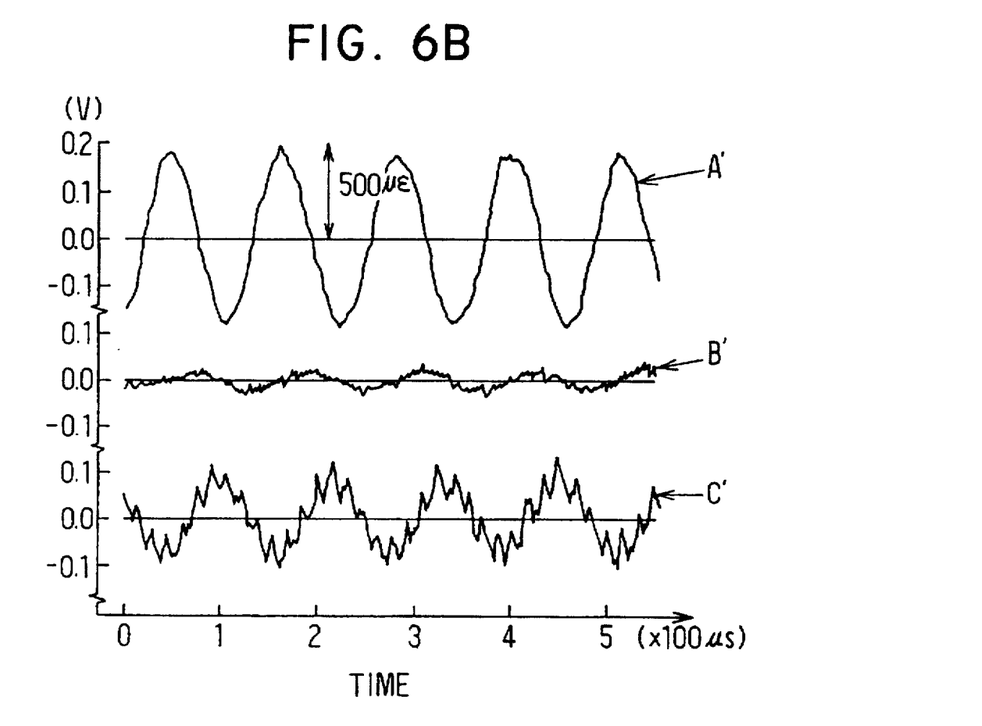

The above knock sensor was tested with respect to vibration mode occurring at various positions A, B and C in FIG. 6A of the piezoelectric element 15 by attaching the same to a vibration testing apparatus (not shown). The test result is shown in FIG. 6B in which the waveforms A', B' and C' are vibration modes at the circumference A of the piezoelectric element 15, at the welded part B just above the annular protrusion 13 (i.e., at the position of contact part 25 of the resilient elastic member 22) and at the radial center of the piezoelectric element 15, respectively. It is understood from this test result that the piezoelectric element 15 vibrates with its vibration fulcrum at the welded part of the annular protrusion 13 and that the vibration modes A' and C' are opposite in phase. Therefore, with the contact part 25 of the resilient conductive member 22 located just above the annular protrusion 13, the voltage generated by the piezoelectric element 15 in response to knocking vibration transmitted through the sensor housing 11 can be transmitted to the output terminal 21 through the resilient conductive member 22 without suppressing vibration of the piezoelectric element 15.

Figure 7A:
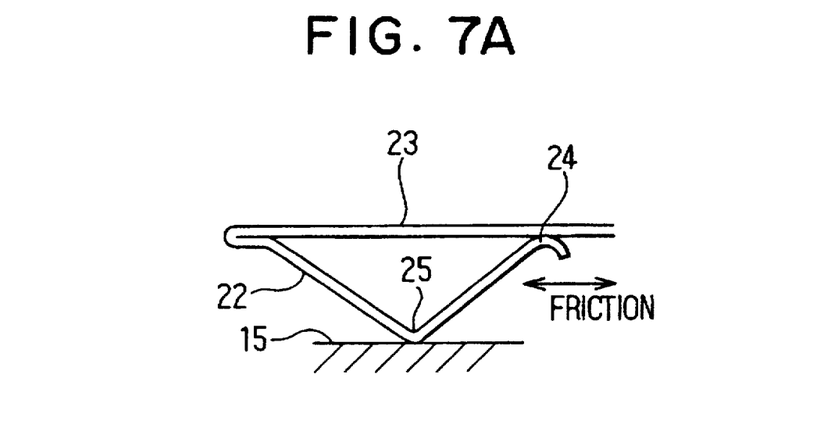
FIGS. 7A and 7B are a schematic view and a graph showing the resilient conductive member and its spring characteristics according to the embodiment, respectively.
Figure 7B:
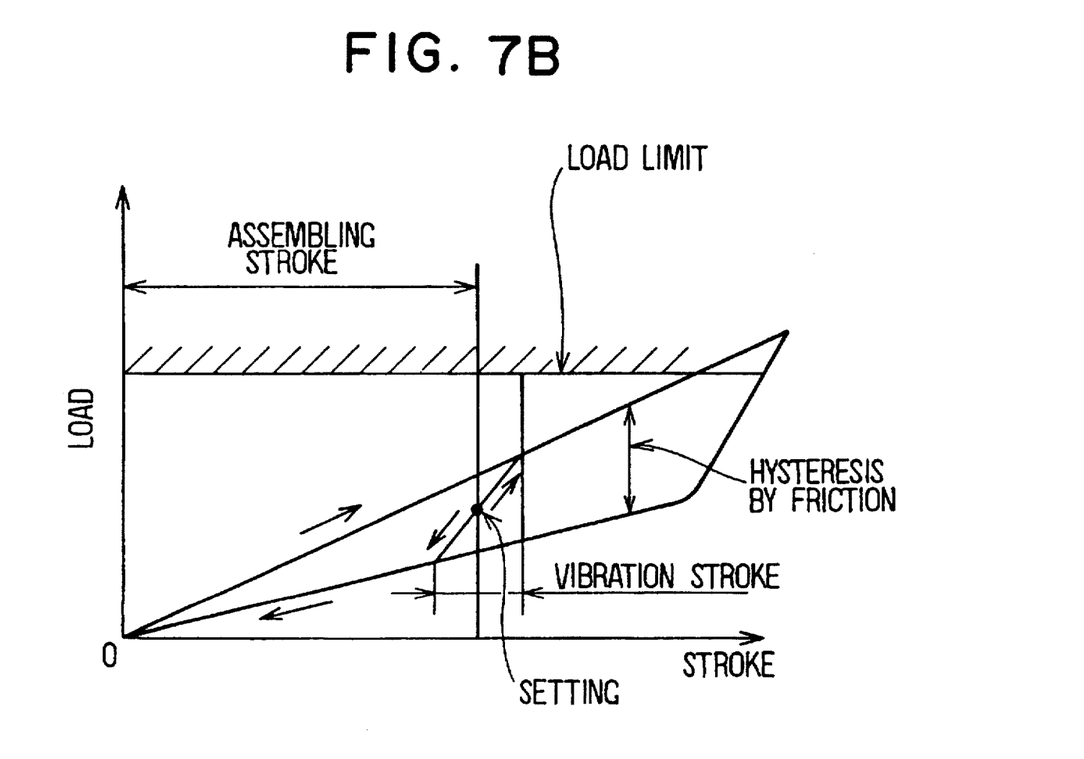

Next, operation and advantages of the V-shaped resilient conductive member 22 are described with reference to FIGS. 7A, 7B in comparison with two comparative examples 1 and 2.

Figure 8A:
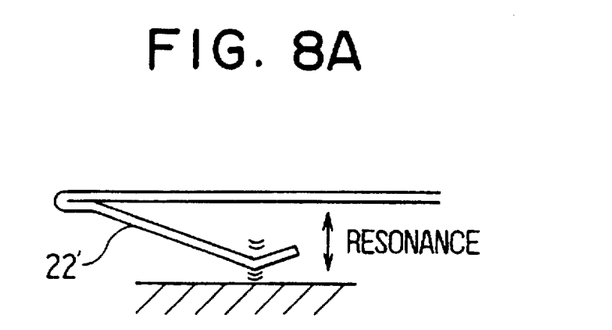
FIGS. 8A and 8B are a schematic view and a graph showing another resilient conductive member in a cantilever type according to a comparative example 1 and its spring characteristics, respectively.
Figure 8B:
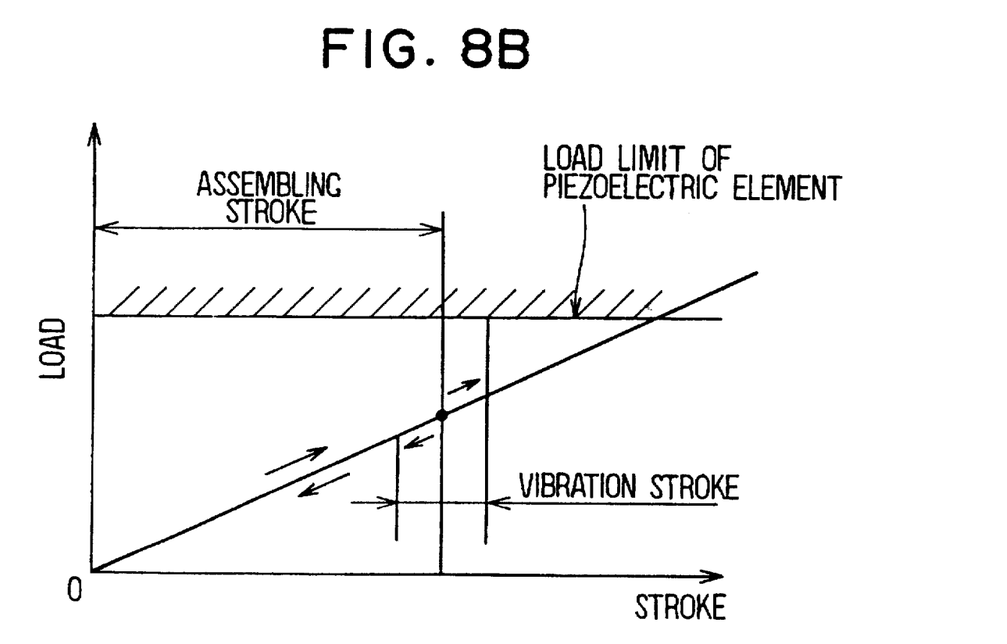

In the comparative example 1 shown in FIG. 8A, a resilient conductive member 22' is in a cantilever type and has no sliding part. This example, which is similar to the one proposed by JP-U 62-128331, has the similar disadvantages described above. That is, the higher spring constant will cause cracks in or excessive wear on the piezoelectric element, while the lower spring constant (FIG. 8B) will cause possibility of resonance of the conductive member at as low as below 10 KHz (FIG. 10) and temporary interruption of electrical connection between the conductive member and the piezoelectric element.

Figure 9A:
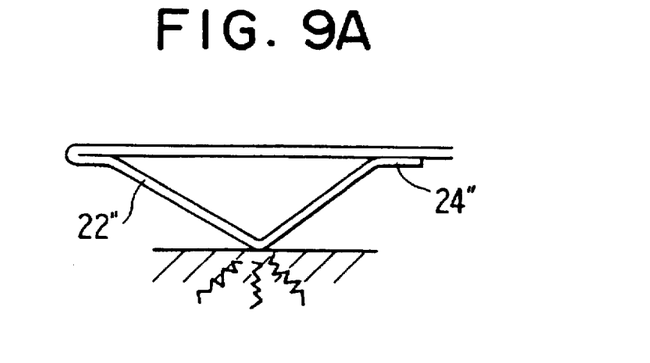
FIGS. 9A and 9B are a schematic view and a graph showing a still another resilient conductive member according to a comparative example 2 and its spring characteristics, respectively.
Figure 9B:
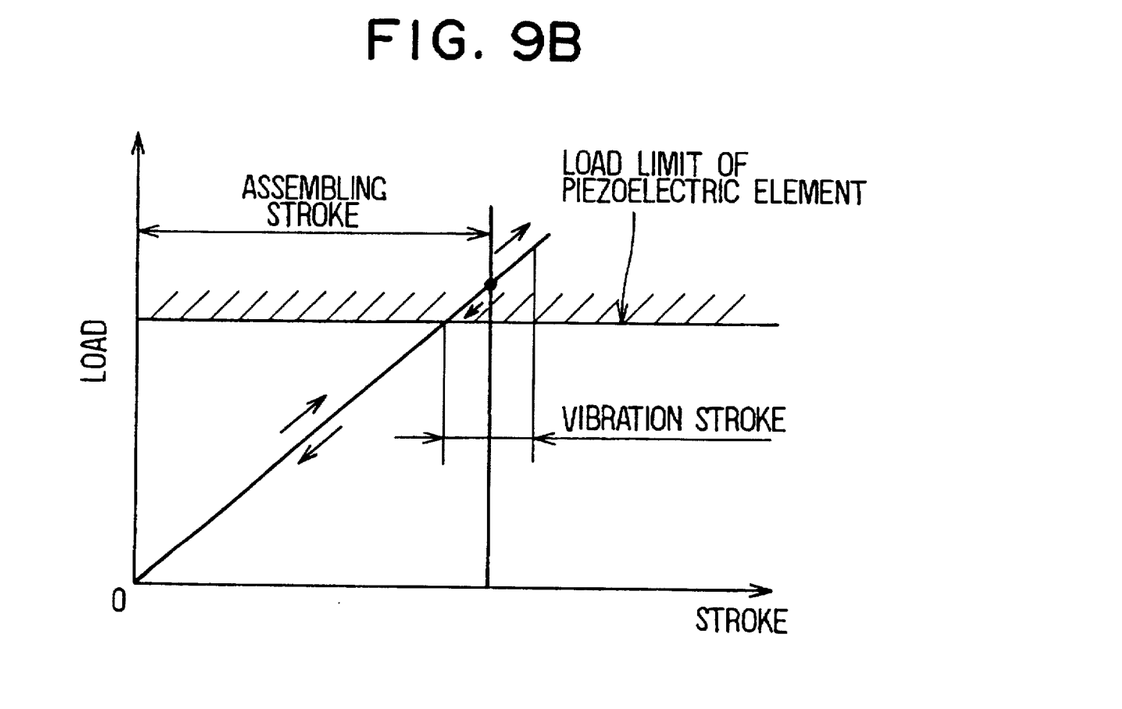

In the comparative example 2 shown in FIG. 9A, the free end part 24" of the V-shaped conductive member 22" is not slidably movable but fixed by welding. This structure will provide a higher spring constant than the comparative example 1. Therefore, as shown in FIG. 9B, excessive load will exert on the piezoelectric element and cause damages such as cracks in the same, when the resilient conductive member 22" is assembled onto the piezoelectric element under pressing force. Further, the V-bottom of the conductive member 22" will also cause excessive wear on the piezoelectric element during use.

According to the present embodiment, the free end of the resilient conductive member 22 operates as the sliding part 24 slidably abutting the fixing part 23. This structure allows the sliding part 24 to slide on the fixing part 23 in accordance with pressing force of the resilient conductive member 22 to the piezoelectric element 15, when the resilient conductive member 22 is assembled onto the piezoelectric element 15 under pressing force.

The friction force is generally the largest under the stationary state and decreases as sliding starts. Although the friction force is rather large when the sliding part 24 starts to slide only a short stroke from the stationary state in response to knocking vibration, it becomes smaller as the sliding stroke becomes larger once the sliding movement starts as in the case of assembling the conductive member 22 onto the piezoelectric element 15. Thus, the sliding structure will restrict excessive pressing force from exerting on the piezoelectric element 15 and obviates possibility of damages on the piezoelectric element 15.

The sliding part 24 slidingly moves on the fixing part 23, when the resilient conductive member 22 vibrates together with the piezoelectric element 15. At this time, friction force occurs between the fixing part 23 and the sliding part in a direction opposite to the sliding direction of the sliding part 24, and friction force occurs also between the contact part 25 and the top electrode of the piezoelectric element 15 in a direction opposite to the sliding direction of the contact part 25 on the piezoelectric element 15. The sliding movement of the contact part 25 is generally small and as low as about a half of that of the sliding part 24 at the time of vibration. Therefore, the sliding friction force which exerts on the contact part 25 is much smaller than that which exerts on the sliding part 24 and may be ignored when the total sliding friction force is considered. As the direction of sliding friction force exerting on the contact part 25 is the same as the direction of the sliding friction force exerting on the sliding part 24, the two sliding friction forces may be considered as a part of the sliding friction force exerting on the sliding part 24 when the spring force of the resilient conductive member 22 is determined.

Thus, when the sliding part 24 slides on the fixing part 23 at the time of vibration, the friction force which exerts on the sliding part 24 in opposition to the sliding movement of the sliding part 24 restricts the sliding movement of the sliding part 24. As a result, the support structure for the resilient conductive member 22 becomes similar to the support structure shown in FIG. 9A, so that the spring constant of the resilient conductive member 22 becomes larger at the time of vibration than at the time of stationary state. Thus, according to the support structure of this embodiment (FIG. 7A), the spring characteristics of the resilient conductive member 22 at the time of vibration will have a hysteresis due to the friction force as shown in FIG. 7B. That is, at the time of vibration, the resilient conductive member 22 will vibrate, like a spring having a large spring constant, with its vibration center on the setting position (FIG. 7B). In FIG. 7B, inclination of the characteristics line becomes larger as the spring constant becomes larger.

Figure 10:
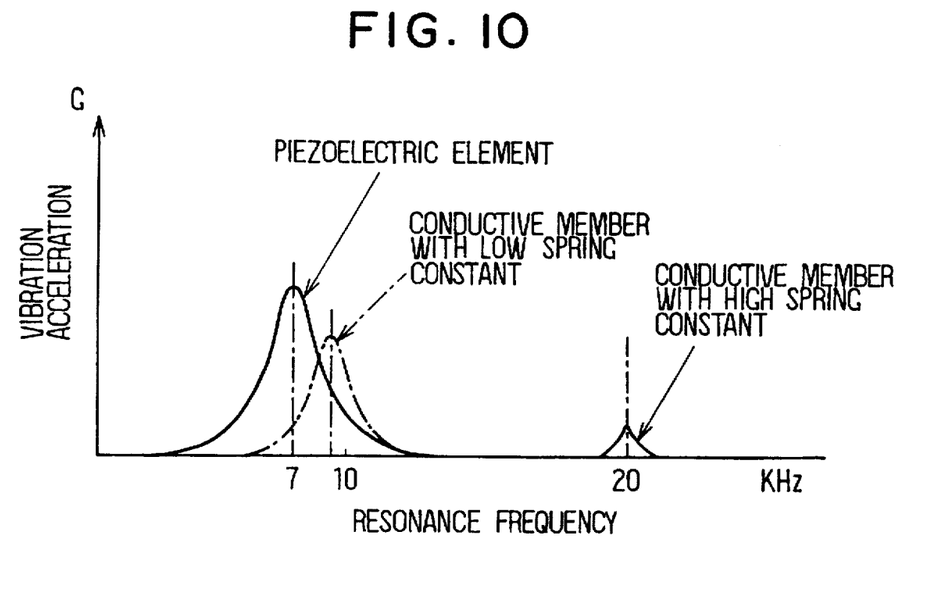
FIG. 10 is a graph showing the relation between the spring constant of the resilient conductive member and the resonance frequency.

In this embodiment, although the spring constant of the resilient conductive member 22 is set low, it is increased temporarily by the friction force when the resilient conductive member 22 moves only a short stroke as in the case of knocking vibration. That is, as the friction hysteresis adds to the spring constant of the resilient conductive member 22 in the stationary state, the spring constant increases at the time of vibration. Therefore, as shown in FIG. 10, the resonance frequency of the resilient conductive member 22 becomes higher than that of the vibration plate 14 (piezoelectric element 15), thus suppressing resonance of the resilient conductive member 22 within a practical range of operation. This will prevent the contact part 25 from bouncing (interruption of electric connection) caused by the resonance of the resilient conductive member 22.

It is to be noted that, also in the support structure of comparative example 1 shown in FIG. 8A, friction occurs between the contact part of the conductive member 22' and the piezoelectric element. However, the resonance frequency will not be raised by the friction because the contact part is likely to bounce under the condition where resonance occurs.

In this embodiment, further, the resilient conductive member 22 is provided in a pair, the knock signal generated by the piezoelectric element 15 will be transmitted assuredly through one conductive member 22 even when the other conductive member 22 fails to contact for some reason.

Figure 11:
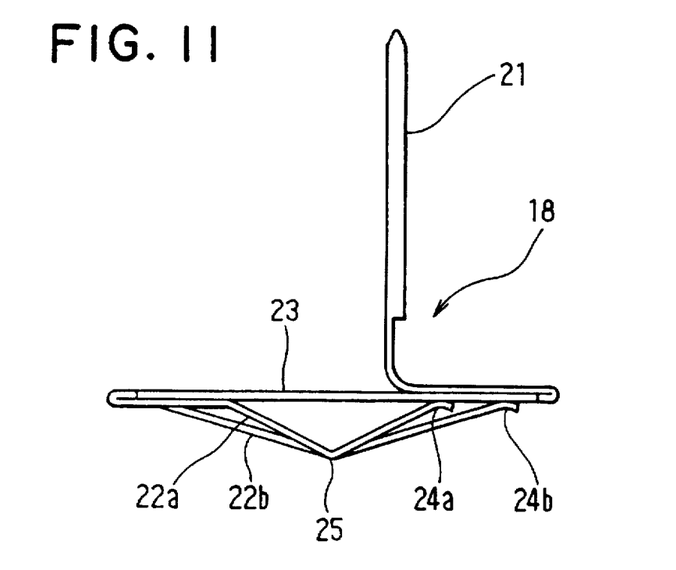
FIG. 11 is a front view of a signal lead and a resilient conductive member according to another embodiment of the present invention.

The conductive member 22 may be provided in excess of two. Further, as shown in FIG. 11, a plurality of (e.g., two) resilient conductive members 22a and 22b may be shaped to have different lengths so that respective sliding parts 24a and 24b are located at different positions from the radial center. According to this modification, the conductive members 22a and 22b have different resonance frequencies, by which one conductive member keeps contacting with the piezoelectric element 15 even when the other conductive member bounces and leaves the same at the time of resonance. The spring constants of the conductive members 22a and 22b at the time of knocking vibration may be differentiated.

In the signal lead 18 shown in FIG. 5, the fixing part 23 (FIG. 5) integrally connecting the output terminal 21 and the conductive member 22 has no central opening so that the fixing part 23 restricts molding resin from flowing toward the conductive member 22 when the signal lead 18 is insert-molded integrally with the connector housing 17. That is, the fixing part 23 may be utilized as a part of a molding die, thus improving molding operation.

The connector assembly 16 may be so modified that the sliding part 24 (24a, 24b) of the resilient conductive member 22 (22a, 22b) slides on additional fixing part provided separately from the fixing part 23. This additional fixing part may be an electrically conductive type or insulating type as long as it provides appropriate friction force. Alternatively, the sliding part 24 (24a, 24b) may be positioned to slide on the connector housing 17.

The present invention should not be limited to the disclosed embodiments and modifications but may be modified further in various ways without departing from the spirit of the invention.

What is claimed is:

1. A vibration sensing device comprising:
   a housing having therein a protrusion and attachable to an object of vibration to be sensed;
   a vibration plate fixed to the protrusion;
   a piezoelectric element joined on the vibration plate for producing a voltage in response to vibration applied thereto through the housing and the vibration plate;
   an output terminal for transmitting the voltage of the piezoelectric element externally from the housing; and
   a resilient conductive member having a stationary spring constant and placed resiliently between the piezoelectric element and the output terminal to connect electrically the piezoelectric element and the output terminal, the resilient conductive member having a sliding part slidable on a specified part in the housing away from the piezoelectric element so that a sliding friction force caused by sliding of the sliding part increases the spring constant of said member during vibration to be larger than the stationary spring constant.

2. The vibration sensing device according to claim 1, wherein, the resilient conductive member has:
   a fixing part connected to the output terminal;
   a base part fixed to the fixing part at a position opposite to the sliding part; and
   an intermediate part connecting the base part and the sliding part in a convex-shape toward the piezoelectric element and contacting the piezoelectric element to press the sliding part slidably on the fixing part.

3. The vibration sensing device according to claim 2, wherein:

the output terminal and the resilient conductive member are integral.

4. The vibration sensing device according to claim 1, wherein:

the protrusion is in an annular ring shape; and the resilient conductive member is provided at a plurality of positions and each resilient conductive member has a convex part contacting the piezoelectric element resiliently at a position above the protrusion.

5. The vibration sensing device according to claim 4, wherein:

each resilient conductive member has a length different from another one.

6. A vibration sensing device for sensing knocking vibration of an engine, comprising:

a housing having therein an annular protrusion and attachable to the engine;

a vibration-voltage converting element fixedly placed on the annular protrusion for producing a voltage in response to vibration applied thereto through the housing;

an output terminal for transmitting the voltage of the converting element externally from the housing; and a resilient conductive member connecting electrically the converting element and the output terminal, the resilient conductive member having a base part held fixedly to the output terminal, a sliding part slidable on a part that is disposed away from and in parallel with and facing the converting element, said sliding part being held slidably at a position opposite to the base part and an intermediate part connecting the base part and the sliding part and having a convex shape which presses the converting element resiliently to the annular protrusion.

7. The vibration sensing device according to claim 6, wherein:

the resilient conductive member further has a fixing part integral with the output terminal and the base part and placed in parallel with the converting element; and the sliding part is placed slidably on the fixing part so that the converting element is in electrical connection to a stationary part through the base part and the sliding part.

8. The vibration sensing device according to claim 6, wherein:

the resilient conductive member is provided at a plurality of positions in parallel; and each resilient conductive member has a convex part contacting the converting element at a position above the annular protrusion.

9. The vibration sensing device according to claim 8, wherein:

each resilient conductive member has a length different from another one.

10. The vibration sensing device according to claim 6, wherein:

the output terminal and the resilient conductive member are intergral.

11. A vibration sensing device comprising:

a housing having therein a protrusion and attachable to an object of vibration to be sensed;

a vibration plate fixed to the protrusion;

a piezoelectric element joined on the vibration plate for producing a voltage in response to vibration applied thereto through the housing and the vibration plate;

an output terminal for transmitting the voltage of the piezoelectric element externally from the housing; and a resilient conductive member having a stationary spring constant and placed resiliently between the piezoelectric element and the output terminal to connect electrically the piezoelectric element and the output terminal, the resilient conductive member having a sliding part slidable on a specified part in the housing, said resilient conductive member having a convex part held in contact with the piezoelectric element to press the sliding part slidably on the specified part in the housing at a position disposed away from the piezoelectric element.

12. A vibration sensor comprising:

a housing, a piezoelectric element disposed within the housing; and a conductive contact structure disposed within the housing including an opposing conductive surface spaced from and approximately parallel to said piezoelectric element and at least one resilient convex conductive member with a mid-portion slidingly disposed in electrical contact with said piezoelectric element and an end portion slidingly disposed against said opposing conductive surface.

13. A vibration sensor as in claim 12 wherein said conductive contact structure comprises a single integral piece of shaped conductive metal.

14. A vibration sensor as in claim 13 wherein said conductive contact structure includes a free end extending away from said housing to serve as an electrical connector terminal.

15. A vibration sensor as in claim 12 wherein said at least one resilient convex conductive member comprises a plurality of convex shaped arms.

16. A vibration sensor as in claim 15 wherein at least some of said convex shaped arms have different convex shapes.

17. A vibration sensor as in claim 12 wherein said housing includes a conductive platform against which said piezoelectric element is pressed by said mid-portion of the at least one resilient convex conductive member.

18. A vibration sensor comprising:

a housing;

a piezoelectric element disposed within the housing; and a convexly shaped resilient conductive contact member in conductive contact with the piezoelectric element and disposed within the housing so as to have a free end and a mid-portion which simultaneously slide against two opposed surfaces.

* * * * *